(12) United States Patent
Nishiumi

(10) Patent No.: US 9,394,840 B2
(45) Date of Patent: Jul. 19, 2016

(54) FUEL PROPERTY DETERMINATION SYSTEM FOR INTERNAL COMBUSTION ENGINE

(75) Inventor: Ryoji Nishiumi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1018 days.

(21) Appl. No.: 13/505,380

(22) PCT Filed: Nov. 11, 2010

(86) PCT No.: PCT/IB2010/002876
§ 371 (c)(1),
(2), (4) Date: May 1, 2012

(87) PCT Pub. No.: WO2011/067643
PCT Pub. Date: Jun. 9, 2011

(65) Prior Publication Data
US 2012/0239276 A1 Sep. 20, 2012

(30) Foreign Application Priority Data
Dec. 4, 2009 (JP) ................................. 2009-276878

(51) Int. Cl.
*F02D 19/06* (2006.01)
*F02D 41/14* (2006.01)
(Continued)

(52) U.S. Cl.
CPC .......... *F02D 41/0025* (2013.01); *F02D 19/061* (2013.01); *F02D 19/0605* (2013.01); *F02D 19/0628* (2013.01); *F02D 19/0636* (2013.01); *F02D 19/0649* (2013.01); *F02D 19/081* (2013.01); *F02D 35/026* (2013.01); *F02D 41/146* (2013.01); *F02D 41/1461* (2013.01);
(Continued)

(58) Field of Classification Search
CPC ............... F02D 19/029; F02D 19/088; F02D 220/0612; Y02T 10/36
USPC ......... 701/103; 123/435; 436/143; 73/114.38
See application file for complete search history.

(56) References Cited

U.S. PATENT DOCUMENTS 4,397,958 A * 8/1983 Vroom ........................ 436/141
4,920,494 A * 4/1990 Abo et al. ..................... 701/104
(Continued)

FOREIGN PATENT DOCUMENTS

DE 10 2008 042 925 B3 6/2010
EP 1 890 024 A1 2/2008
(Continued)

OTHER PUBLICATIONS

International Search Report issued in International Application No. PCT/IB2010/002876 dated Mar. 23, 2011.
(Continued)

*Primary Examiner* — Mahmoud Gimie
*Assistant Examiner* — David Hamaoui
(74) *Attorney, Agent, or Firm* — Oliff PLC

(57) ABSTRACT

A fuel injection pressure at a timing at which an NOx concentration (combustion temperature) indicates a maximum value under the condition that a fuel injection timing is fixed to a first injection timing is recorded as a first NOx peak injection pressure. Similarly, a second NOx peak injection pressure is recorded under the condition that the fuel injection timing is fixed to a second injection timing. A cetane number and distillation property of fuel are determined on the basis of these NOx peak injection pressures.

6 Claims, 9 Drawing Sheets

(51) Int. Cl.
*F02D 41/00* (2006.01)
*F02D 19/08* (2006.01)
*F02D 35/02* (2006.01)

(52) U.S. Cl.
CPC ......... *F02D 2200/0612* (2013.01); *Y02T 10/36* (2013.01)

(56) References Cited

U.S. PATENT DOCUMENTS

| | | | |
|---|---|---|---|
| 5,469,831 A | 11/1995 | Takahashi | |
| 6,216,452 B1 * | 4/2001 | Naito et al. | 60/278 |
| 7,028,532 B2 * | 4/2006 | Shinzawa | 73/35.02 |
| 8,185,293 B2 * | 5/2012 | Jiang et al. | 701/102 |
| 8,256,281 B2 * | 9/2012 | Nishiumi | 73/114.49 |
| 2007/0044759 A1 | 3/2007 | Yamaguchi et al. | |
| 2009/0099754 A1 * | 4/2009 | Reuss et al. | 701/103 |

FOREIGN PATENT DOCUMENTS

| | | |
|---|---|---|
| JP | A-2004-308440 | 11/2004 |
| JP | A-2004-340026 | 12/2004 |
| JP | 2008303860 A * | 12/2008 |
| JP | A-2009-068406 | 4/2009 |
| WO | WO 2009/112907 A1 | 9/2009 |

OTHER PUBLICATIONS

Written Opinion issued in International Application No. PCT/IB2010/002876 dated Mar. 23, 2011.

* cited by examiner

| T90 | Pcr1 | | | |
|---|---|---|---|---|
| | 80 | 120 | 160 | 200 |
| Pcr2 80 | 320 | 280 | 240 | 200 |
| 120 | 330 | 300 | 260 | 220 |
| 160 | 350 | 320 | 300 | 240 |
| 200 | 400 | 350 | 330 | 280 |

| CETANE NUMBER | Pcr1 | | | |
|---|---|---|---|---|
| | 80 | 120 | 160 | 200 |
| Pcr2 80 | 65 | 68 | 72 | 75 |
| 120 | 55 | 60 | 65 | 70 |
| 160 | 45 | 50 | 60 | 65 |
| 200 | 35 | 40 | 50 | 60 |

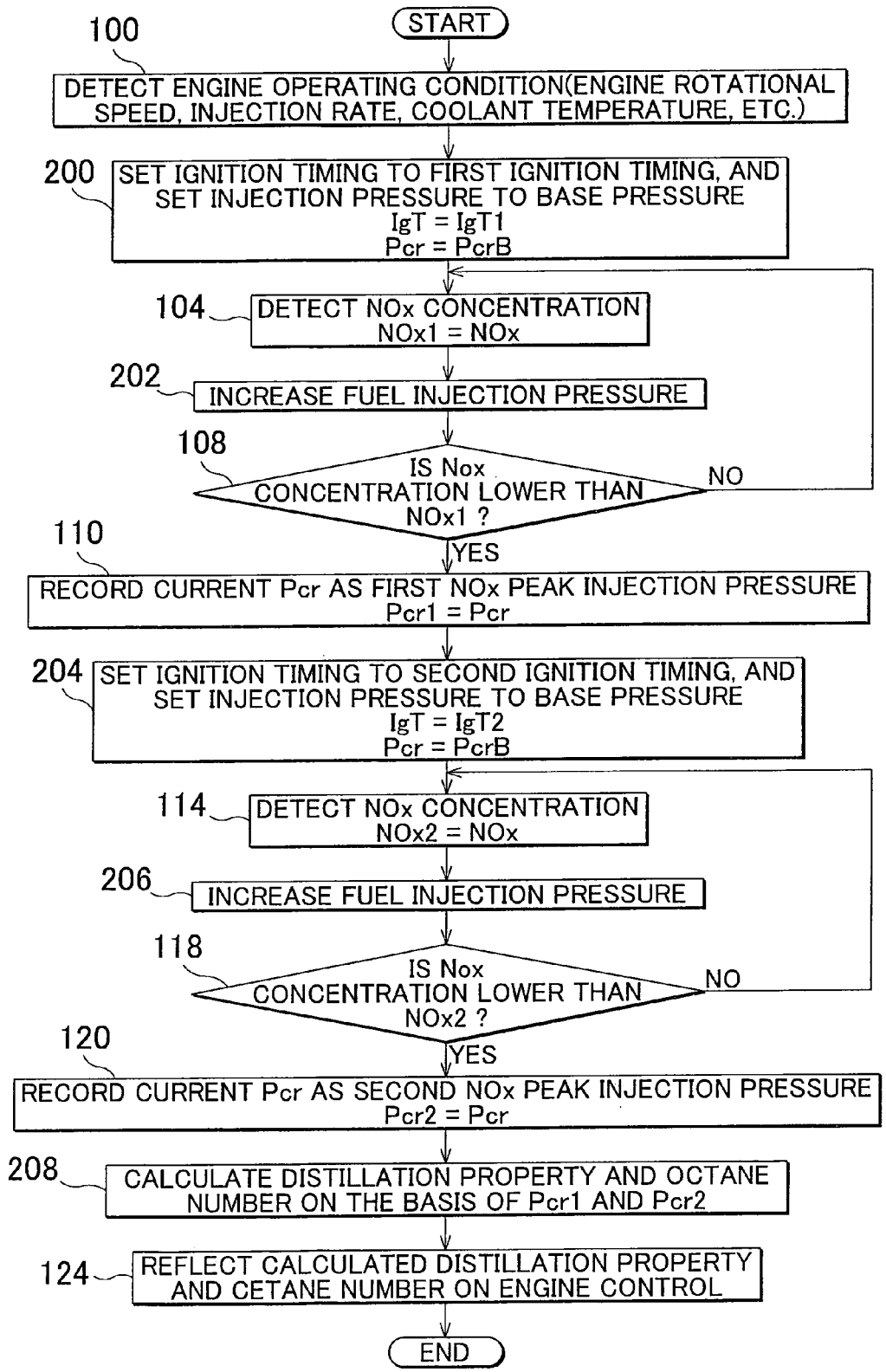

FUEL PROPERTY DETERMINATION SYSTEM FOR INTERNAL COMBUSTION ENGINE

This Application claims priority to Japanese Application No. 2009-276878 filed Dec. 4, 2009. The disclosure of the prior application is hereby incorporated by reference herein in its entirety.

BACKGROUND OF THE INVENTION

1. Field of the Invention

The invention relates to a fuel property determination system for an internal combustion engine.

2. Description of the Related Art

An existing technique for determining the property of fuel used in an internal combustion engine is, for example, described in Japanese Patent Application Publication No. 2004-340026 (JP-A-2004-340026), Japanese Patent Application Publication No. 2009-68406 (JP-A-2009-68406) and Japanese Patent Application Publication No. 2004-308440 (JP-A-2004-308440). For example, JP-A-2004-340026 describes a control method for a compression ignition diesel engine. In the above existing control method, in a predetermined operating condition, an engine exciting force caused by an in-cylinder pressure is detected by exciting force detecting means that has a piezoelectric element. Then, the cetane number corresponding to the detected exciting force is determined on the basis of correlation data between an exciting force and a cetane number. The correlation data are created under the same operating condition in advance.

Combustion in a compression ignition internal combustion engine is significantly influenced by not only the cetane number determined in the above described existing control method but also an evaporation index, such as the distillation property of fuel. Thus, it is desirable to determine both the cetane number and the evaporation index at the same time. However, the above existing method is not able to determine the evaporation index together with the cetane number at the same time. In addition, in the case of a spark ignition internal combustion engine as well, similarly, it is desirably able to determine both the octane number and the evaporation index at the same time.

SUMMARY OF INVENTION

The invention provides a fuel property determination system for a compression ignition or spark ignition internal combustion engine, which is able to accurately determine both the cetane number or octane number and the evaporation index of fuel at the same time.

An aspect of the invention provides a fuel property determination system for a compression ignition internal combustion engine. The fuel property determination system includes: a first parameter changing unit that is configured to change a first operating parameter for varying a degree of mixing of fuel and air that are supplied into a combustion chamber of the internal combustion engine; a second parameter changing unit that is configured to change a second operating parameter for varying a combustion temperature of a mixture of fuel and air; a determination unit that is configured to determine a timing at which the combustion temperature indicates a maximum value when the first operating parameter is changed under the condition that the second operating parameter is fixed; a first recording unit that is configured to record the first operating parameter at the timing at which the determination unit determines that the combustion temperature indicates the maximum value under the condition that the second operating parameter is fixed to a predetermined first setting value as a first recorded value; a second recording unit that is configured to record the first operating parameter at the timing at which the determination unit determines that the combustion temperature indicates the maximum value under the condition that the second operating parameter is fixed to a predetermined second setting value as a second recorded value; and a fuel property determination unit that is configured to determine a cetane number and evaporation index of the fuel on the basis of the first recorded value and the second recorded value.

As the cetane number and evaporation index of the fuel change, the timing at which the combustion temperature indicates the maximum value varies when the first operating parameter (for example, fuel injection pressure) for varying the degree of mixing of fuel and air is changed under the condition that the second operating parameter (for example, fuel injection timing) for varying the combustion temperature of an air-fuel mixture is fixed. Thus, the value of the first operating parameter at the timing at which the combustion temperature indicates the maximum value reflects the cetane number and evaporation index of the currently used fuel. With the above fuel property determination system, the first operating parameter at the timing at which the combustion temperature indicates the maximum value under the condition that the second operating parameter is set to one of at least two levels, that is, the first setting value, is recorded as the first recorded value, and the first operating parameter at the timing at which the combustion temperature indicates the maximum value under the condition that the second operating parameter is set to the other one of at least two levels, that is, the second setting value, is recorded as the second recorded value. Thus, the fuel property is determined on the basis of the above first recorded value and second recorded value, so it is possible to accurately determine the cetane number and evaporation index of the fuel at the same time.

In addition, in the above fuel property determination system, the first operating parameter may be a fuel injection pressure, the second operating parameter may be a fuel injection timing, the determination unit may include an NOx concentration detecting unit that is configured to detect an NOx concentration in exhaust gas flowing through an exhaust passage, the determination unit may be configured to determine a timing at which the NOx concentration in exhaust gas indicates a maximum value is the timing at which the combustion temperature indicates the maximum value when the fuel injection pressure is changed under the condition that the fuel injection timing is fixed, the first recording unit may be configured to record the fuel injection pressure at the timing at which the determination unit determines that the combustion temperature indicates the maximum value under the condition that the fuel injection timing is fixed to the first setting value as the first recorded value, and the second recording unit may be configured to record the fuel injection pressure at the timing at which the determination unit determines that the combustion temperature indicates the maximum value under the condition that the fuel injection timing is fixed to the second setting value as the second recorded value.

As the cetane number and evaporation index of the fuel change, a timing at which the NOx concentration indicates the maximum value varies when the fuel injection pressure is changed under the condition that the fuel injection timing is fixed. Thus, the value of fuel injection pressure at the timing at which the NOx concentration indicates the maximum value reflects the cetane number and evaporation index of the currently used fuel. With the above fuel property determination system, the fuel injection pressure at the timing at which the NOx concentration indicates the maximum value under the condition that the fuel injection timing is set to one of at least two levels, that is, the first setting value, is recorded as the first recorded value, and the first injection pressure at the timing at which the NOx concentration indicates the maximum value under the condition that the fuel injection timing is set to the other one of at least two levels, that is, the second setting value, is recorded as the second recorded value. Thus, the fuel property is determined on the basis of the above first recorded value and second recorded value, so it is possible to accurately determine the cetane number and evaporation index of the fuel at the same time.

Another aspect of the invention provides a fuel property determination system for a spark ignition internal combustion engine. The fuel property determination system includes: a first parameter changing unit that is configured to change a first operating parameter for varying a degree of mixing of fuel and air that are supplied into a combustion chamber of the internal combustion engine; a second parameter changing unit that is configured to change a second operating parameter for varying a combustion temperature of a mixture of fuel and air; a determination unit that is configured to determine a timing at which the combustion temperature indicates a maximum value when the first operating parameter is changed under the condition that the second operating parameter is fixed; a first recording unit that is configured to record the first operating parameter at the timing at which the determination unit determines that the combustion temperature indicates the maximum value under the condition that the second operating parameter is fixed to a predetermined first setting value as a first recorded value; a second recording unit that is configured to record the first operating parameter at the timing at which the determination unit determines that the combustion temperature indicates the maximum value under the condition that the second operating parameter is fixed to a predetermined second setting value as a second recorded value; and a fuel property determination unit that is configured to determine an octane number and evaporation index of the fuel on the basis of the first recorded value and the second recorded value.

As the octane number and evaporation index of the fuel change, the timing at which the combustion temperature indicates the maximum value varies when the first operating parameter (for example, fuel injection pressure) for varying the degree of mixing of fuel and air is changed under the condition that the second operating parameter (for example, ignition timing) for varying the combustion temperature of an air-fuel mixture is fixed. Thus, the value of the first operating parameter at the timing at which the combustion temperature indicates the maximum value reflects the octane number and evaporation index of the currently used fuel. With the above fuel property determination system, the first operating parameter at the timing at which the combustion temperature indicates the maximum value under the condition that the second operating parameter is set to one of at least two levels, that is, the first setting value, is recorded as the first recorded value, and the first operating parameter at the timing at which the combustion temperature indicates the maximum value under the condition that the second operating parameter is set to the other one of at least two levels, that is, the second setting value, is recorded as the second recorded value. Thus, the fuel property is determined on the basis of the above first recorded value and second recorded value, so it is possible to accurately determine the octane number and evaporation index of the fuel at the same time.

In addition, in the above fuel property determination system, the first operating parameter may be a fuel injection pressure, the second operating parameter may be an ignition timing, the determination unit may include an NOx concentration detecting unit that is configured to detect an NOx concentration in exhaust gas flowing through an exhaust passage, the determination unit may be configured to determine a timing at which the NOx concentration in exhaust gas indicates a maximum value is the timing at which the combustion temperature indicates the maximum value when the fuel injection pressure is changed under the condition that the ignition timing is fixed, the first recording unit may be configured to record the fuel injection pressure at the timing at which the determination unit determines that the combustion temperature indicates the maximum value under the condition that the ignition timing is fixed to the first setting value as the first recorded value, and the second recording unit may be configured to record the fuel injection pressure at the timing at which the determination unit determines that the combustion temperature indicates the maximum value under the condition that the ignition timing is fixed to the second setting value as the second recorded value.

As the octane number and evaporation index of the fuel change, a timing at which the NOx concentration indicates the maximum value varies when the fuel injection pressure is changed under the condition that the ignition timing is fixed. Thus, the value of fuel injection pressure at the timing at which the NOx concentration indicates the maximum value reflects the octane number and evaporation index of the currently used fuel. With the above fuel property determination system, the fuel injection pressures at the timing at which the NOx concentration indicates the maximum value under the condition that the ignition timing is set to one of at least two levels, that is, the first setting value, is recorded as the first recorded value, and the fuel injection pressures at the timing at which the NOx concentration indicates the maximum value under the condition that the ignition timing is set to the other one of at least two levels, that is, the second setting value, is recorded as and the second recorded value. Thus, the fuel property is determined on the basis of the above first recorded value and second recorded value, so it is possible to accurately determine the octane number and evaporation index of the fuel at the same time.

Here, the evaporation index may be a distillation property or may be the kinematic viscosity of the fuel.

In addition, in the above respective fuel property determination systems, the first operating parameter may be any one of a fuel injection pressure and an engine coolant temperature.

With the above fuel property determination system, the first operating parameter may be appropriately set.

In addition, in the above respective fuel property determination systems, the second operating parameter may be any one of a fuel injection timing, an ignition timing, an intake air flow rate and a compression ratio.

With the above fuel property determination system, the second operating parameter may be appropriately set.

In addition, in the above respective fuel property determination systems, the determination unit may include an NOx concentration detecting unit that is configured to detect an NOx concentration in exhaust gas flowing through an exhaust passage, wherein the determination unit may be configured to determine that a timing at which the NOx concentration in exhaust gas indicates a maximum value is the timing at which the combustion temperature indicates the maximum value when the first operating parameter is changed under the condition that the second operating parameter is fixed.

With the above fuel property determination system, it is possible to determine the timing at which the combustion temperature indicates the maximum value on the basis of the NOx concentration that correlates with the combustion temperature.

BRIEF DESCRIPTION OF DRAWINGS

The features, advantages, and technical and industrial significance of this invention will be described below with reference to the accompanying drawings, in which like numerals denote like elements, and wherein:

FIG. 12 is a flowchart of a routine executed in the second embodiment of the invention.

DETAILED DESCRIPTION OF EMBODIMENTS

Figure 1:
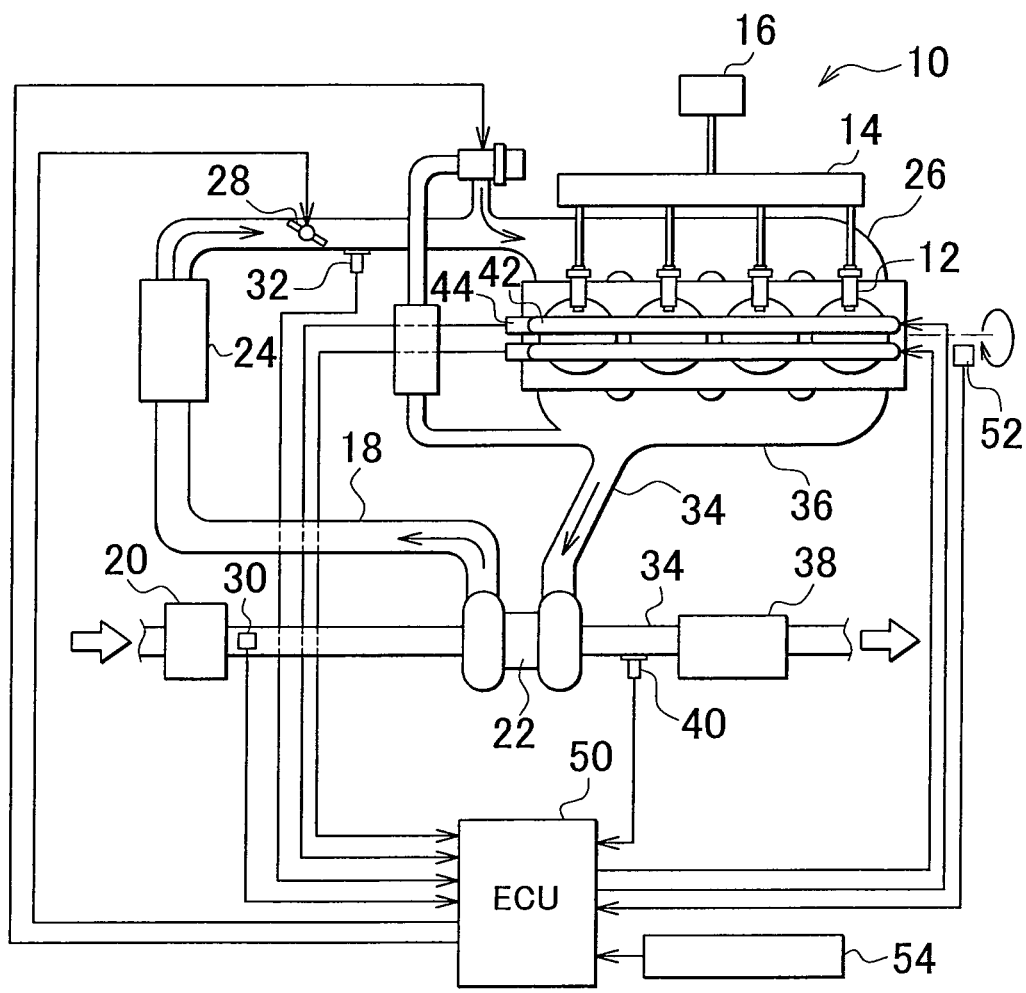
FIG. 1 is a view for illustrating the system configuration according to a first embodiment of the invention.

A first embodiment of the invention will be described with reference to FIG. 1 to FIG. 8B. First, the system configuration will be described. FIG. 1 is a view for illustrating the system configuration according to the first embodiment of the invention. The system shown in FIG. 1 includes an internal combustion engine 10. The internal combustion engine 10 is a four-cycle diesel engine (compression ignition internal combustion engine). A fuel injection valve 12 is provided for each cylinder of the internal combustion engine 10. Each fuel injection valve 12 directly injects fuel into a corresponding one of the cylinders. The fuel injection valve 12 of each cylinder is connected to a shared common rail 14. Fuel in a fuel tank (not shown) is pressurized by a supply pump 16 up to a predetermined fuel pressure and is stored in the common rail 14. Then, the stored fuel is supplied from the common rail 14 to each fuel injection valve 12. With such a fuel injection system that includes the common rail 14, a fuel injection pressure and a fuel injection timing may be varied.

An air cleaner 20 is provided near an inlet of an intake passage 18 of the internal combustion engine 10. Air taken in through the air cleaner 20 is compressed by a compressor of a turbocharger 22, and is then cooled by an intercooler 24. The intake air passing through the intercooler 24 is distributed to intake ports of the respective cylinders by an intake manifold 26.

An intake throttle valve 28 is provided between the intercooler 24 and the intake manifold 26. In addition, an air flow meter 30 is provided near downstream of the air cleaner 20. The air flow meter 30 detects the intake air flow rate. Furthermore, an intake air pressure sensor 32 is provided downstream of the intake throttle valve 28. The intake air pressure sensor 32 detects the intake air pressure (supercharging pressure).

An exhaust passage 34 of the internal combustion engine 10 branches off by an exhaust manifold 36, and is connected to exhaust ports of the respective cylinders. In addition, a turbine of the turbocharger 22 is arranged in the exhaust passage 34. An exhaust emission control device 38 is provided downstream of the turbocharger 22 in the exhaust passage 34. The exhaust emission control device 38 is used to purify exhaust gas. In addition, an NOx concentration sensor 40 is provided at a portion upstream of the exhaust emission control device 38 in the exhaust passage 34. The NOx concentration sensor 40 detects the NOx concentration in exhaust gas flowing through that portion.

In addition, the system shown in FIG. 1 includes a variable intake valve mechanism 42 that is able to change the valve opening characteristic of an intake valve (not shown) of each cylinder. More specifically, here, the variable intake valve mechanism 42 has a function of being capable of changing the opening and closing timing of each intake valve by varying the phase of each intake cam (not shown) using a hydraulic pressure or a motor. Furthermore, the variable intake valve mechanism 42 includes an intake cam angle sensor 44 for detecting the rotational position (advanced amount) of an intake camshaft.

In addition, the system according to the present embodiment includes an electronic control unit (ECU) 50. Various sensors for detecting the operating state of the internal combustion engine 10 are connected to the ECU 50 in addition to the above described sensors. The various sensors, for example, include a crank angle sensor 52 for detecting the rotational angle (crank angle) and rotational speed (engine rotational speed) of a crankshaft and a coolant temperature sensor 54 for detecting the engine coolant temperature. In addition, various actuators for controlling the operating state of the internal combustion engine 10 are connected to the ECU 50 in addition to the above described various actuators. The ECU 50 drives the actuators in accordance with a predetermined program on the basis of those sensor signals and information to thereby control the operating state of the internal combustion engine 10.

Next, a fuel property determination method according to the first embodiment will be described. In the internal combustion engine, a fuel property significantly influences combustion and catalyst. In addition, when the use of synthetic fuel, biofuel, or the like, increases, the cetane number and distillation property (evaporation index that indicates the evaporability of fuel) of fuel used range widely. As a result, it is increasingly important to accurately determine the property of fuel. Then, in the present embodiment, a method of determining the distillation property and cetane number of fuel at the same time by utilizing the fact that evaporation and combustion of fuel at the time of premixed combustion carried out in the compression ignition internal combustion engine are easily influenced by the distillation property and cetane number of fuel will be described.

Figure 2:
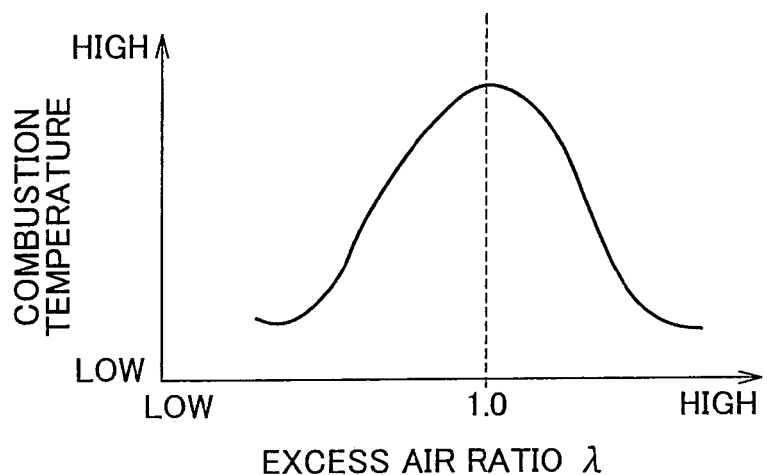
FIG. 2 is a graph that shows the relationship between a combustion temperature and an excess air ratio λ.

FIG. 2 is a graph that shows the relationship between a combustion temperature and an excess air ratio λ. As shown in FIG. 2, the combustion temperature varies with the degree of mixing of fuel and air (excess air ratio λ) at the time of combustion. More specifically, the combustion temperature is the highest when the excess air ratio λ is close to 1, and the combustion temperature decreases as the excess air ratio λ increases or decreases from 1.

Figure 3:
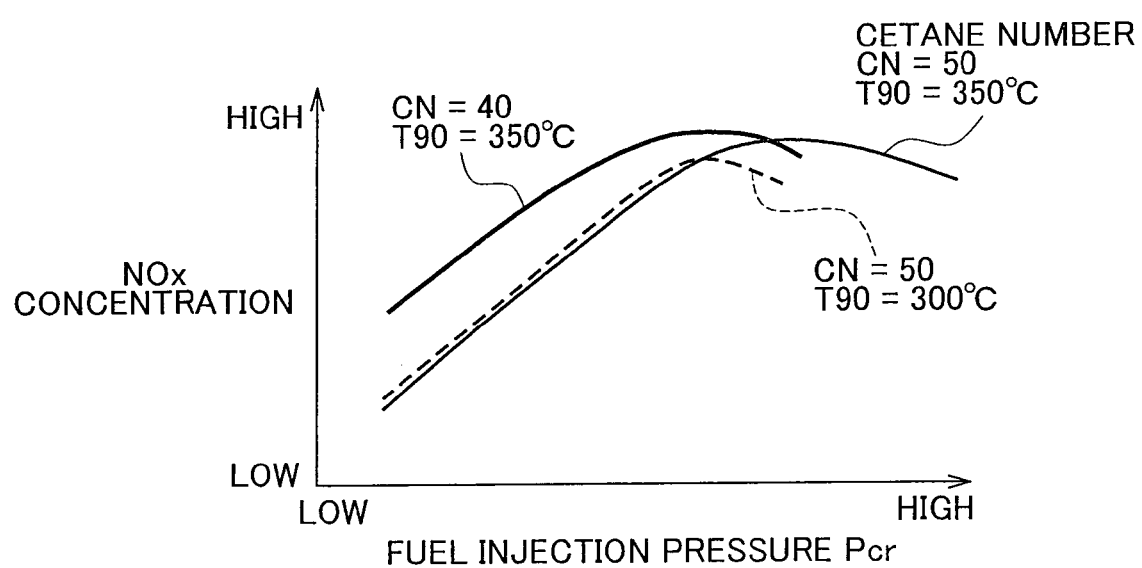
FIG. 3 is a graph that shows the relationship between an NOx concentration and a fuel injection pressure Pcr for each fuel property.

FIG. 3 is a graph that shows the relationship between an NOx concentration and a fuel injection pressure Pcr for each fuel property. The NOx concentration (the amount of NOx emission) in exhaust gas exhausted from the cylinders of the internal combustion engine 10 is significantly influenced by the combustion temperature. As the fuel injection pressure (hereinafter, referred to as "injection pressure") Pcr is increased, atomization of injected fuel advances, so mixing of fuel and air is facilitated. As a result, the combustion temperature increases, and the NOx concentration increases. In the compression ignition internal combustion engine 10, fuel injected into each cylinder burns while being mixed with air. Therefore, when a mixture of air and fuel injected into each cylinder is locally considered, there are portions that indicate various excess air ratios λ in the cylinder, ranging from a portion having a considerably high excess air ratio λ (considerably lean air-fuel mixture) to a portion having a considerably low excess air ratio λ (considerably rich air-fuel mixture).

The combustion temperature is the highest when the percentage of portions, at which the excess air ratio λ is close to 1, is the highest in the cylinder. In this case, the NOx concentration is also the highest. When the injection pressure Pcr is further increased from a value at which the NOx concentration is the highest, the percentage of portions at which the excess air ratio λ is higher than 1 (air-fuel mixture is lean) increases. As a result, the combustion temperature decreases, and the NOx concentration reduces. Thus, the NOx concentration has a peak value (maximum value) as shown in FIG. 3 against a variation in injection pressure Pcr.

In addition, the relationship between the NOx concentration (combustion temperature) and the injection pressure Pcr varies depending on a fuel property (distillation property and cetane number). More specifically, when the cetane number CN of fuel is high, ignitability of fuel improves, so an ignition delay time is reduced. Reduction in an ignition delay time means reduction in a period of time during which fuel and air are mixed with each other before ignition of injected fuel is started. Therefore, in order to increase the percentage of lean portions in each cylinder to a degree to which the NOx concentration (combustion temperature) decreases, a further higher injection pressure Pcr is required. Thus, as shown in FIG. 3, a fuel having a higher cetane number CN has a higher injection pressure Pcr at which the NOx concentration (combustion temperature) indicates a peak value. In addition, when the distillation property of fuel is high, atomization of fuel improves, so mixing of fuel and air is facilitated. Therefore, even when the injection pressure Per is low, favorable combustion is achieved, and the combustion temperature increases. Thus, as shown in FIG. 3, a fuel having a higher distillation property (T90 (90% distillate temperature) is low) has a lower injection pressure Pcr at which the NOx concentration (combustion temperature) indicates a peak value.

As shown in FIG. 3, when the property of injected fuel changes, even when the injection pressure Pcr is the same value, the local excess air ratio λ in each cylinder varies, so, basically, the combustion temperature varies, and the NOx concentration varies. Incidentally, as is apparent through comparison between a waveform (CN=40, T90=350° C.) indicated by the wide solid line in FIG. 3 and a waveform (CN=50, T90=300° C.) indicated by the broken line, with respect to fuel of which the cetane number CN is 50 and T90 is 350° C. (corresponding to a waveform indicated by the narrow solid line in FIG. 3), even when a fuel has only a low cetane number CN or even when a fuel has only a low T90 (light fuel), there is a case where the injection pressure Pcr at which the NOx concentration indicates a peak value becomes the same value because of an increase in percentage of portions at which the excess air ratio λ is lean. Thus, even when one injection pressure Pcr at which the NOx concentration indicates a peak value is acquired, it may be difficult to accurately determine the cetane number and the distillation property at the same time.

Figure 4:
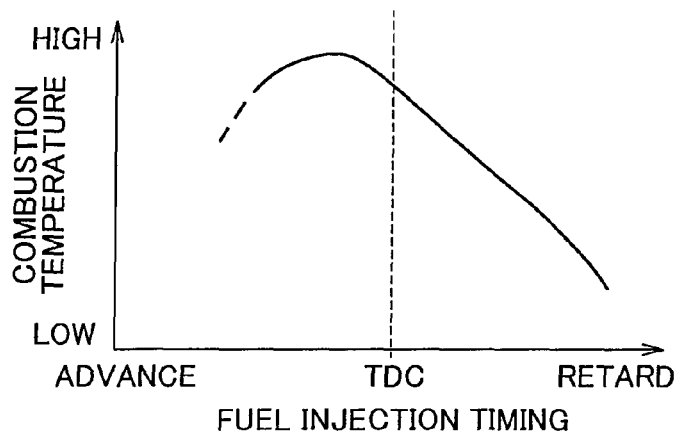
FIG. 4 is a graph that shows the relationship between a combustion temperature and a fuel injection timing.

FIG. 4 is a view that shows the relationship between a combustion temperature and a fuel injection timing. As shown in FIG. 4, the combustion temperature is the highest when the fuel injection timing (hereinafter, referred to as "injection timing") is slightly advanced with respect to a compression top dead center, and the combustion temperature decreases as the ignition timing is further advanced or retarded. In this way, when the injection timing is changed, the combustion temperature may be varied.

Figure 5A:
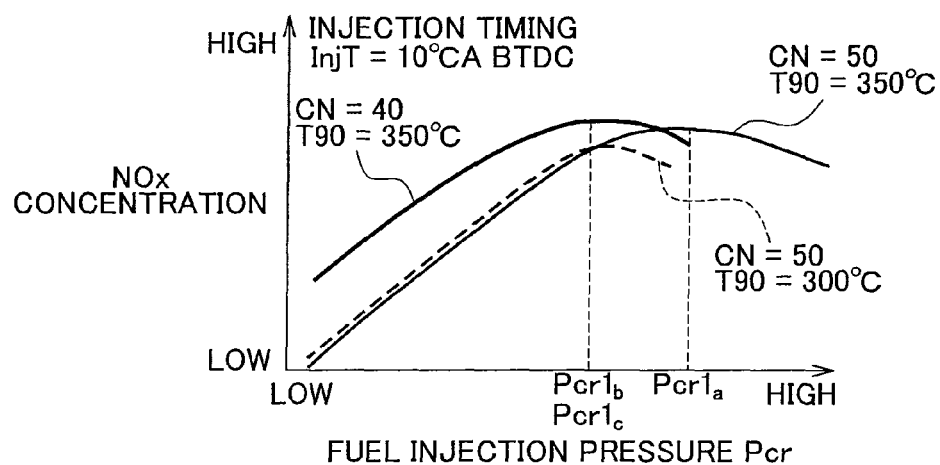
FIG. 5A and FIG. 5B are graphs for comparing the relationships between an NOx concentration and a fuel injection pressure at two levels of fuel injection timing.
Figure 5B:
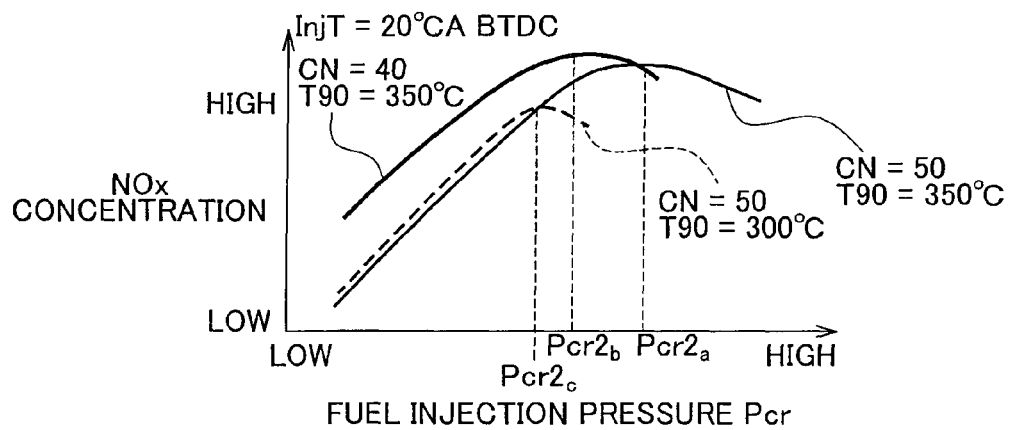

FIG. 5A and FIG. 5B are graphs for comparing the relationships between an NOx concentration and a fuel injection pressure at two levels of fuel injection timing. More specifically, FIG. 5A is a graph when the injection timing InjT is a first injection timing InjT1 (=10° CABTDC), and FIG. 5B is a graph when the ignition timing InjT is a second ignition timing InjT2 (=20° CABTDC) that is advanced with respect to the first ignition timing InjT1. In addition, here, the injection pressure Pcr at which the NOx concentration indicates a peak value at the first injection timing InjT1 is defined as an NOx peak injection pressure Pcr1, and the injection pressure Pcr at which the NOx concentration indicates a peak value at the second injection timing InjT2 is defined as an NOx peak injection pressure Pcr2.

As shown in FIG. 5A and FIG. 5B, when the injection timing InjT is changed, the peak injection pressures Pcr1a and Pcr2a, and the like, of respective fuels having different properties vary. In addition, when the injection timing InjT is changed, a relative difference in the NOx peak injection pressure Pcr1, Pcr2, or the like, between fuels having different properties (for example, a relative difference between Pcr2b and Pcr2c varies against a relative difference between Pcr1b and Pcr1c). Thus, by acquiring two NOx peak injection pressures Pcr1 and Pcr2 at two levels of injection timing InjT1 and InjT2, it is possible to accurately determine both the cetane number and the distillation property while the influence of the cetane number and the influence of the distillation property on a variation in NOx peak injection pressure Pcr1, or the like, are separated.

Figure 6:
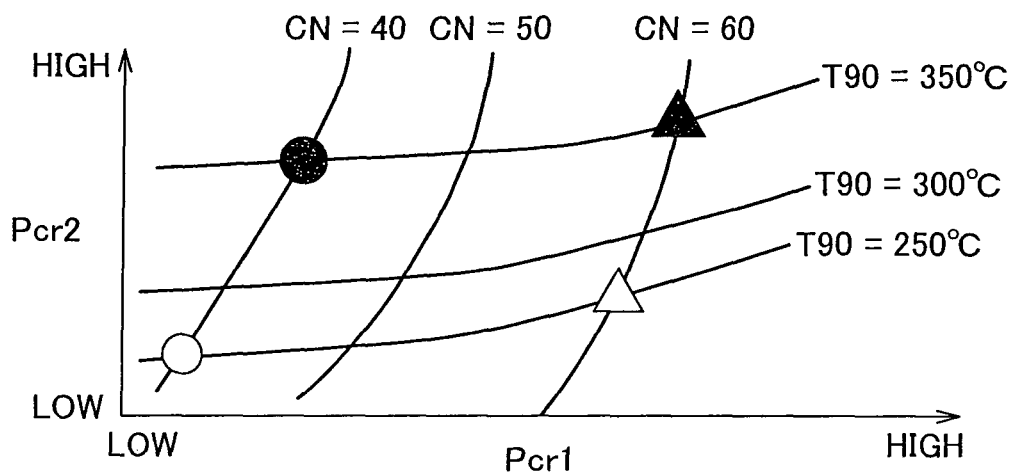
FIG. 6 is a graph that shows the relationship between a first NOx peak injection pressure Pcr1 and a second NOx peak injection pressure Pcr2, and that shows the tendency of criterion information that defines a cetane number CN and a distillation property T90.

FIG. 6 is a graph that shows the relationship between the first NOx peak injection pressure Pcr1 and the second NOx peak injection pressure Pcr2, and that shows the tendency of criterion information that defines a cetane number CN and a distillation property T90. When the relationships shown in FIG. 5A and FIG. 5B are combined while the abscissa axis represents the first NOx peak injection pressure Pcr1 and the ordinate axis represents the second NOx peak injection pressure Pcr2, the relationship shown in FIG. 6 may be obtained. In the criterion information shown in FIG. 6, as the first NOx peak injection pressure Pcr1 increases in a state where the second NOx peak injection pressure Pcr2 is fixed, the cetane number CN increases, and the distillation temperature in T90 decreases. In addition, as the second NOx peak injection pressure Pcr2 increases in a state where the first NOx peak injection pressure Pcr1 is fixed, the cetane number CN decreases, and the distillation temperature in T90 increases.

In the present embodiment, the information shown in FIG. 6, that is, the criterion information that defines the cetane number CN and the distillation property T90 are mapped with respect to the relationship between the first NOx peak injection pressure Pcr1 and the second NOx peak injection pressure Pcr2, and is prestored in the ECU 50. Then, in an actual machine, the first NOx peak injection pressure Pcr1 and the second NOx peak injection pressure Pcr2 each are calculated at two predetermined injection timings, and then the cetane number and distillation property of the currently used fuel are determined (detected) at the same time by referring to the above criterion information.

Figure 7:
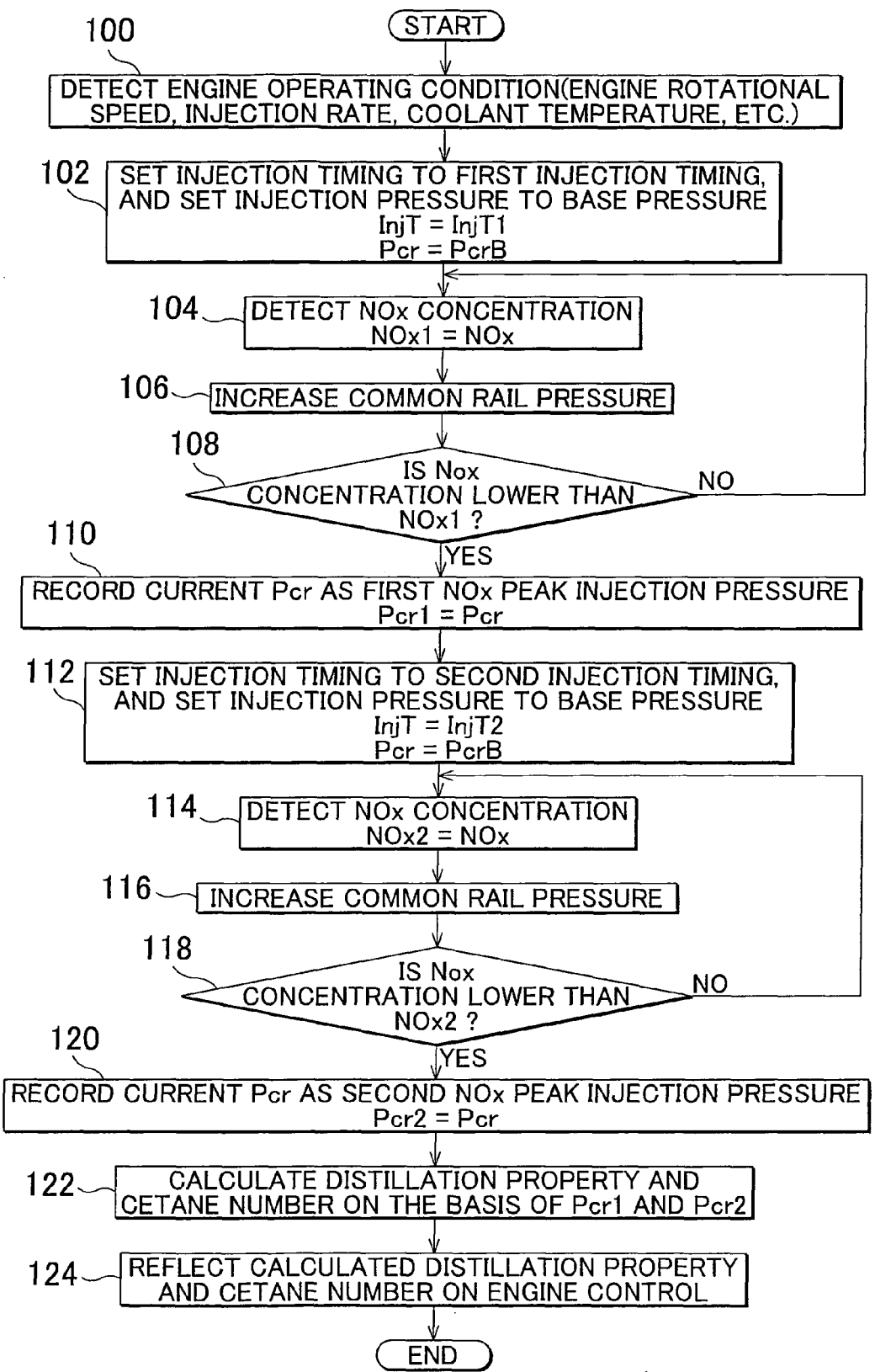
FIG. 7 is a flowchart of a routine executed in the first embodiment of the invention.

FIG. 7 is a flowchart that shows the routine executed by the ECU 50 in the first embodiment in order to implement the above function. In the routine shown in FIG. 7, first, a current engine operating condition (for example, an engine rotational speed, a fuel injection rate and an engine coolant temperature) is detected (step 100). Subsequently, the injection timing InjT is set to the first injection timing InjT1, and the injection pressure Pcr is set to a predetermined base pressure PcrB (step 102).

Then, the NOx concentration from the cylinders under the condition set in step 102 is detected and is stored as NOx1 (step 104). After that, the injection pressure (common rail pressure) Pcr is increased from the current injection pressure Pcr (base pressure PcrB for the first time) by a predetermined amount α (step 106).

Subsequently, it is determined whether the NOx concentration at the injection pressure Pcr increased in step 106 is lower than the value NOx1 stored in step 104 (step 108). As a result, when the determination is negative, the processes of steps 104 and 106 are repeatedly executed until the determination is affirmative.

On the other hand, when the determination is affirmative in step 108, that is, when it is determined that a timing, at which the NOx concentration indicates a peak value (maximum value), has come when the injection pressure Pcr is changed under the condition that the injection timing InjT is fixed to the first injection timing InjT1, the current injection pressure Pcr is recorded as the first NOx peak injection pressure Pcr1 (step 110).

Subsequently, the injection timing InjT is set to the second injection timing InjT2 that is advanced with respect to the first injection timing InjT1, and the injection pressure Pcr is set to the predetermined base pressure PcrB (step 112).

Then, the concentration of NOx from the cylinders under the condition set in step 112 is detected and stored as NOx 2 (step 114). After that, the injection pressure (common rail pressure) Pcr is increased from the current injection pressure Pcr (base pressure PcrB for the first time) by a predetermined amount α (step 116).

Subsequently, it is determined whether the NOx concentration at the injection pressure Per increased in step 116 is lower than the value NOx2 stored in step 114 (step 118). As a result, when the determination is negative, the processes of steps 114 and 116 are repeatedly executed until the determination is affirmative.

On the other hand, when the determination is affirmative in step 118, that is, when it is determined that a timing, at which the NOx concentration indicates a peak value (maximum value), has come when the injection pressure Pcr is changed under the condition that the injection timing InjT is fixed to the second injection timing InjT2, the current injection pressure Pcr is recorded as the second NOx peak injection pressure Pcr2 (step 120).

Figures 8A, 8B, 9:
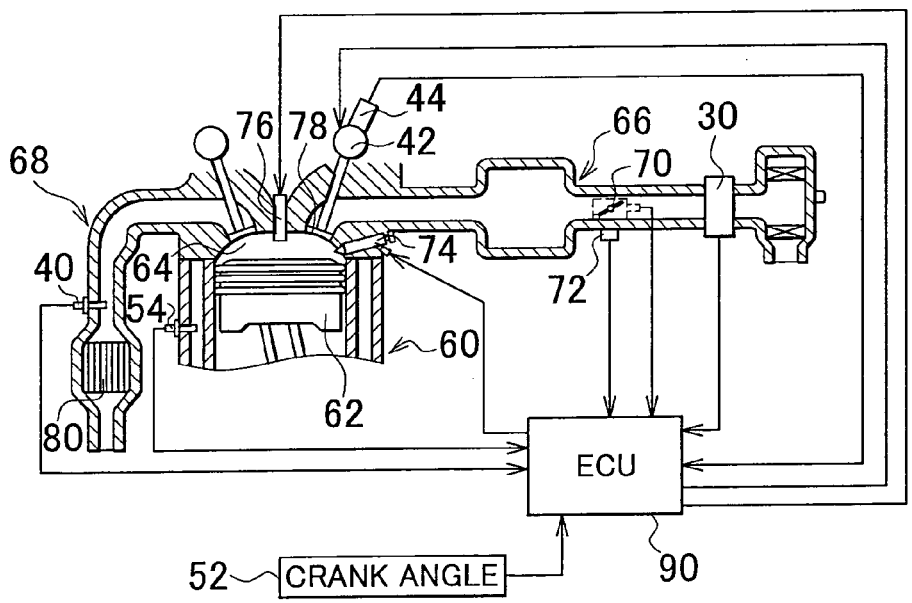
FIG. 8A and FIG. 8B are tables that show examples of a map referred to in the routine shown in FIG. 7.
FIG. 9 is a view for illustrating the system configuration according to a second embodiment of the invention.

After that, the distillation property (T90) and cetane number CN of the currently used fuel are calculated on the basis of the thus recorded first NOx peak injection pressure Pcr1 and second NOx peak injection pressure Pcr2 (step 122). The ECU 50 stores a map that defines T90 and the cetane number CN in the relationship between the NOx peak injection pressures Pcr1 and Pcr2 as criterion information for determining a fuel property. FIG. 8A and FIG. 8B are examples of such a map, and these maps reflect the relationship shown in FIG. 6. That is, as shown in FIG. 8A, T90 increases with an increase in second NOx peak injection pressure Pcr2 in a state where the first NOx peak injection pressure Pcr1 is fixed, and decreases with an increase in first NOx peak injection pressure Pcr1 in a state where the second NOx peak injection pressure Pcr2 is fixed. In addition, as shown in FIG. 8B, the cetane number CN reduces with an increase in second NOx peak injection pressure Pcr2 in a state where the first NOx peak injection pressure Pcr1 is fixed, and increases with an increase in first NOx peak injection pressure Pcr1 in a state where the second NOx peak injection pressure Pcr2 is fixed. Note that, instead of the maps shown in FIG. 8A and FIG. 8B, it is also applicable that the relationship shown in FIG. 6 is defined as a predetermined relational expression and then the distillation property (T90) and the cetane number CN are calculated by referring to the relational expression.

Subsequently, the distillation property (T90) and cetane number CN of fuel, calculated in step 122, are reflected on engine control (step 124).

As the cetane number and evaporation index of fuel change, a timing, at which the NOx concentration indicates the maximum value, varies when the fuel injection pressure Pcr is changed under the condition that the fuel injection timing InjT is fixed. Thus, the NOx peak injection pressure Pcr1, and the like, reflect the cetane number and evaporation index of the currently used fuel. With the thus described routine shown in FIG. 7, the first NOx peak injection pressure Pcr1 and the second NOx peak injection pressure Pcr2 each are calculated at predetermined two levels of injection timing InjT1 and InjT2, and then the cetane number and distillation property of the currently used fuel are determined (detected) by referring to the criterion information. As described above, even when a fuel has only a low cetane number or even when a fuel (light fuel) has only a low T90, there is a case where the NOx peak injection pressure Pcr1, or the like, becomes the same value because of an increase in percentage of portions at which the excess air ratio λ is lean. Therefore, when only one NOx peak injection pressure Pcr1, or the like, is acquired, it may be difficult to determine the cetane number and the distillation property at the same time. In contrast, with the method according to the present embodiment, by just executing a series of processes of the routine once, it is possible to highly accurately determine the cetane number and the distillation property at the same time.

When the property (cetane number or distillation property) of fuel changes, the injection pressure Pcr at which the combustion temperature indicates the maximum value varies. With the above routine, an output of the NOx concentration sensor 40, which is already provided for the internal combustion engine 10, is utilized to make it possible to determine the timing at which the combustion temperature indicates the maximum value on the basis of the NOx concentration that correlates with the combustion temperature.

In addition, with the above routine, in order to make it possible to determine the cetane number and the distillation property at the same time, an operating parameter changed between two levels at the time of the determination is set to a fuel injection timing, so it is possible to instantaneously change the combustion temperature. By so doing, a period of time required for property determination may be reduced, so the property determination may be made in such a manner that the operating parameter is changed between two levels while the operating state of the internal combustion engine 10 does not change so much. In terms of this point as well, it is possible to make accurate determination.

Incidentally, in the above described first embodiment, the fuel injection pressure Pcr is used as a first operating parameter that varies the degree of mixing of fuel and air that are supplied into each combustion chamber of the compression ignition internal combustion engine 10. However, the first operating parameter according to the aspect of the invention is not limited to the fuel injection pressure; it may be, for example, an engine coolant temperature.

In addition, in the above described first embodiment, the fuel injection timing InjT is used as a second operating parameter that varies the combustion temperature of an air-fuel mixture. However, the second operating parameter according to the aspect of the invention is not limited to the fuel injection timing; it may be, for example, an intake air flow rate or a compression ratio. As the intake air flow rate or the compression ratio varies, the compression end temperature varies, and the combustion temperature (and the ignition delay time) varies. Note that the intake air flow rate may be, for example, varied by changing the closing timing of the intake valves using the variable intake valve mechanism 42. In addition, the compression ratio may be varied by a variable compression ratio mechanism (not shown) that is able to vary the compression ratio.

In addition, in the above described first embodiment, the distillation property (T90) is used as the evaporation index. However, the evaporation index according to the aspect of the invention is not limited to the distillation property; the evaporation index may be, for example, the kinematic viscosity of fuel. As the kinematic viscosity of fuel decreases, fuel is easily atomized, so the evaporation of fuel improves. Therefore, the kinematic viscosity may be used as the evaporation index.

In addition, in the above described first embodiment, two NOx peak injection pressures Pcr1 and Pcr2 are acquired at two levels of injection timing InjT1 and InjT2, and then the cetane number and the distillation property are determined at the same time. However, the idea of the aspect of the invention is not limited to the above; it is also applicable that three or more recorded values (for example, NOx peak injection pressures) are acquired at three or more levels of first operating parameter and then the cetane number and the distillation property are determined at the same time. By increasing the number of levels used, it is possible to further improve determination accuracy.

Note that, in the above described first embodiment, the ECU 50 executes the process of step 106 or 116 to implement an example of a "first parameter changing unit" that changes the first operating parameter. The ECU 50 executes the process of step 102 or 112 to implement an example of a "second parameter changing unit" that changes the second operating parameter. The ECU 50 executes the process of step 108 or 118 to implement an example of a "determination unit" that determines the timing at which the combustion temperature indicates the maximum value. The ECU 50 executes the process of step 110 to implement an example of a "first recording unit" that records the first operating parameter as a first recorded value. The ECU 50 executes the process of step 120 to implement an example of a "second recording unit" that records the first operating parameter, at the timing at which the combustion temperature is determined to indicate the maximum value, as a second recorded value. The ECU 50 executes the process of step 122 to implement an example of a "fuel property determination unit" that determines the cetane number and evaporation index of fuel. In addition, the ECU 50 executes the process of step 104 or 114 to implement an example of an "NOx concentration detecting unit" that detects the NOx concentration.

Next, a second embodiment of the invention will be described with reference to FIG. 9 to FIG. 12. FIG. 9 is a view for illustrating the system configuration according to the second embodiment of the invention. Note that, in FIG. 9, like reference numerals denote similar components to those shown in FIG. 1 and the description thereof is omitted or simplified.

The system shown in FIG. 9 includes an internal combustion engine 60. The internal combustion engine 60 is a four-cycle gasoline engine (spark ignition internal combustion engine). A piston 62 is provided in each cylinder of the internal combustion engine 60. A combustion chamber 64 is formed in each cylinder of the internal combustion engine 60 on a top portion side of the piston 62. An intake passage 66 and an exhaust passage 68 are in fluid communication with the combustion chambers 64.

A throttle valve 70 is provided downstream of the air flow meter 30 in the intake passage 66. The throttle valve 70 is an electronically controlled throttle valve that is able to control the throttle opening degree even when the throttle opening degree does not necessarily linearly correspond to an accelerator operation amount. A throttle sensor 72 is arranged near the throttle valve 70. The throttle sensor 72 detects the throttle opening degree.

A fuel injection valve 74 is provided for a cylinder head of the internal combustion engine 60 in each combustion chamber 64 (in each cylinder). Each fuel injection valve 74 is used to directly inject fuel into a corresponding one of the combustion chambers 64. High-pressure fuel is pumped by a fuel pump (not shown) to the fuel injection valves 74. In addition, an ignition plug 76 is assembled to the cylinder head of the internal combustion engine 60 so as to project from the top portion of a corresponding one of the combustion chamber 64 into the combustion chamber 64.

The system shown in FIG. 9 also includes the variable intake valve mechanism 42 for opening and closing the intake valves 78. In addition, the NOx concentration sensor 40 is arranged at a portion upstream of the catalyst 80 in the exhaust passage 68.

The system shown in FIG. 9 includes an electronic control unit (ECU) 90. Various sensors, such as the above described sensors, for detecting the operating state of the internal combustion engine 60 are connected to the input port of the ECU 90. In addition, the above described various actuators are connected to the output port of the ECU 90. The ECU 90 controls the operating state of the internal combustion engine 60 on the basis of outputs of those sensors.

Figure 10A:
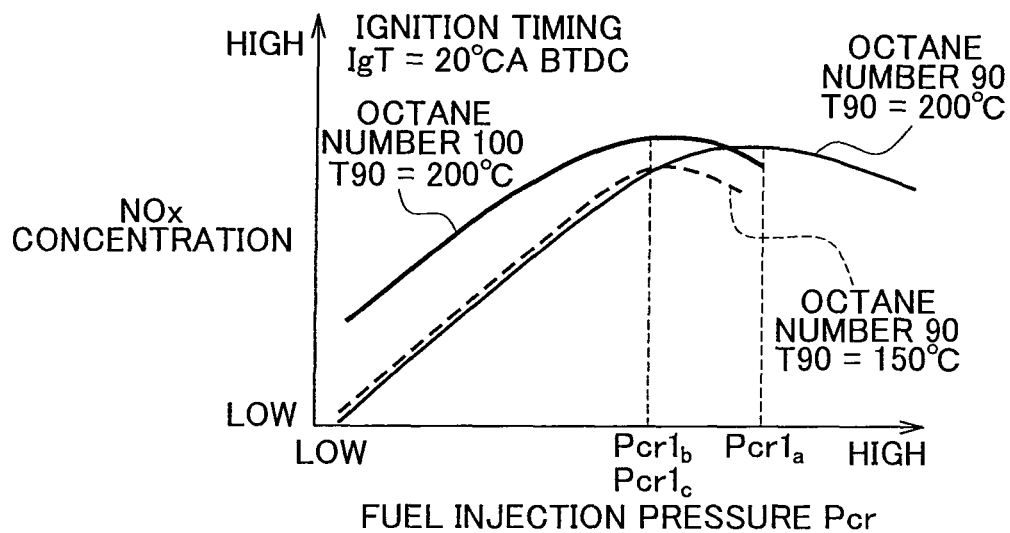
FIG. 10A and FIG. 10B are graphs for comparing the relationships between an NOx concentration and a fuel injection pressure at two levels of ignition timing.
Figure 10B:
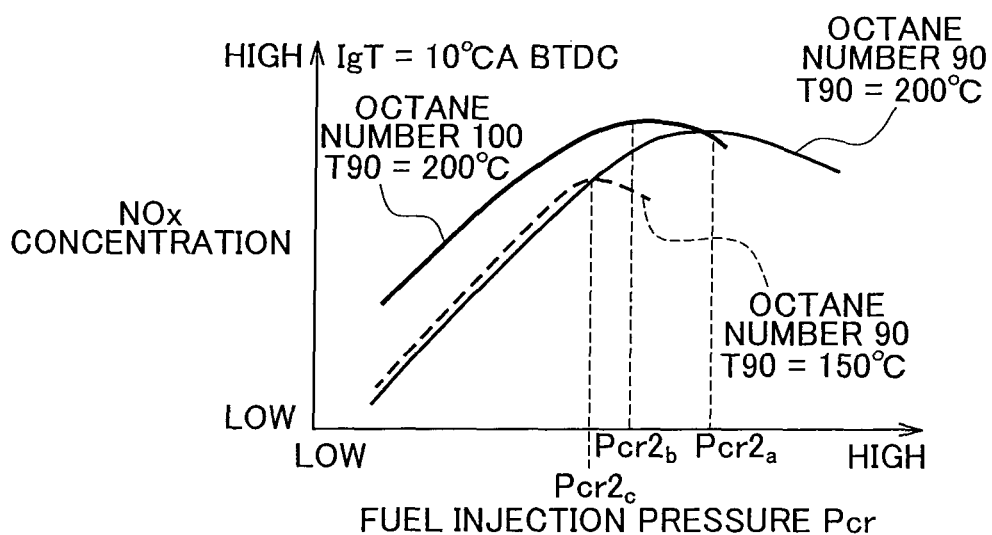

Next, a fuel property determination method according to the second embodiment will be described. FIG. 10A and FIG. 10B are graphs for comparing the relationships between an NOx concentration and a fuel injection pressure at two levels of ignition timing. More specifically, FIG. 10A is a graph when the ignition timing IgT is a first ignition timing IgT1 (=20° CABTDC), and FIG. 10B is a graph when the ignition timing IgT is a second ignition timing IgT2 (=10° CABTDC) that is retarded with respect to the first ignition timing IgT1. In addition, in the present embodiment, the injection pressure Pcr at which the NOx concentration indicates a peak value at the first ignition timing IgT1 is defined as an NOx peak injection pressure Pcr1, and the injection pressure Pcr at which the NOx concentration indicates a peak value at the second ignition timing IgT2 is defined as an NOx peak injection pressure Pcr2.

Even when the octane number and distillation property are considered as a fuel property in the spark ignition internal combustion engine 60, the relationship between the NOx concentration and the injection pressure Pcr varies depending on the fuel property (distillation property and octane number), as shown in FIG. 10A and FIG. 10B. More specifically, because a fuel having a higher octane number is hard to burn, the injection pressure Pcr at which the NOx concentration (combustion temperature) indicates a peak value decreases. In addition, in the case of a type in which fuel is directly injected into each cylinder, mixing of fuel and air tends to be nonuniform in the cylinder as compared with a type in which fuel is injected into each intake port, and a fuel having a high distillation property (evaporable) allows uniform mixing of fuel and air in the cylinder. Thus, when lean burn operation is performed, a fuel having a higher distillation property (T90 (90% distillate temperature) is low) allows a lower injection pressure Pcr at which the NOx concentration (combustion temperature) indicates a peak value.

In addition, as shown in FIG. 10A and FIG. 10B, when the ignition timing IgT is changed, the peak injection pressures Pcr1a and Pcr2a, and the like, in each of fuels having different properties vary. In addition, when the ignition timing IgT is changed, a relative difference in NOx peak injection pressure Pcr1, Pcr2, or the like, between fuels having different properties varies (for example, a relative difference between Pcr2b and Pcr2c varies with respect to a relative difference between Pcr1b and Pcr1c). Thus, by acquiring two NOx peak injection pressures Pcr1 and Pcr2 at two levels of ignition timing IgT1 and IgT2, it is possible to accurately determine both the octane number and the distillation property at the same time while the influence of the octane number and the influence of the distillation property on a variation in NOx peak injection pressure Pcr1, or the like, are separated.

Figure 11:
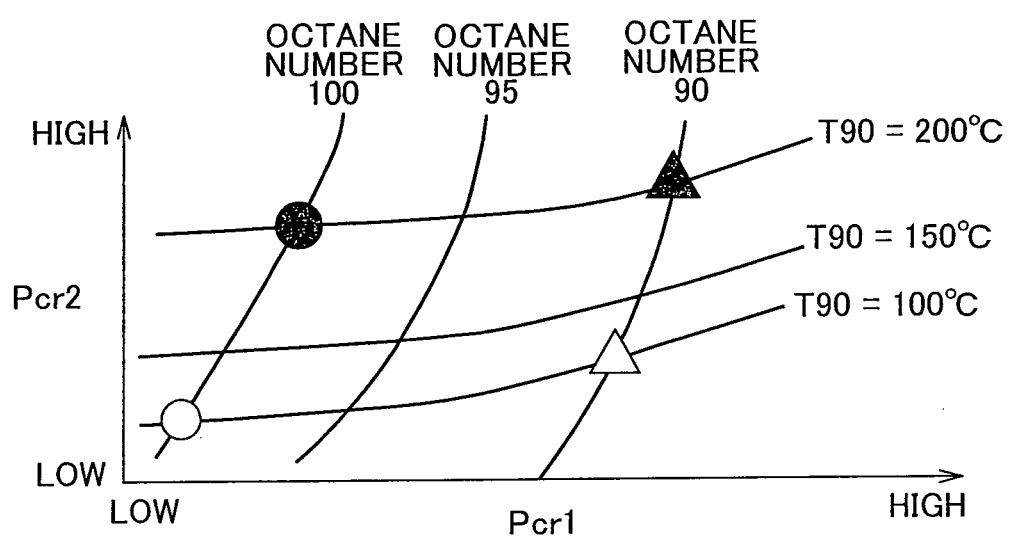
FIG. 11 is a graph that shows the relationship between a first NOx peak injection pressure Pcr1 and a second NOx peak injection pressure Pcr2, and that shows the tendency of criterion information that defines an octane number and a distillation property T90.

FIG. 11 is a graph that shows the relationship between a first NOx peak injection pressure Pcr1 and a second NOx peak injection pressure Pcr2, and that shows the tendency of criterion information that defines an octane number and a distillation property T90; and When the relationships shown in FIG. 10A and FIG. 10B are combined while the abscissa axis represents the first NOx peak injection pressure Pcr1 and the ordinate axis represents the second NOx peak injection pressure Pcr2, the relationship shown in FIG. 11 may be obtained. In the criterion information shown in FIG. 11, as the first NOx peak injection pressure Pcr1 increases in a state where the second NOx peak injection pressure Pcr2 is fixed, the octane number decreases, and the distillation temperature in T90 decreases. In addition, as the second NOx peak injection pressure Pcr2 in a state where the first NOx peak injection pressure Pcr1 is fixed, the octane number increases, and the distillation temperature in T90 increases.

The fuel property determination method according to the present embodiment calculates each of the first NOx peak injection pressure Pcr1 and the second NOx peak injection pressure Pcr2 at two levels of ignition timing IgT1 and IgT2 shown in FIG. 10A and FIG. 10B, and then determines (detects) the octane number and distillation property of the currently used fuel at the same time by referring to the criterion information shown in FIG. 11.

FIG. 12 is a flowchart that shows the routine executed by the ECU 90 in the second embodiment in order to implement the above function. Note that, in FIG. 12, like step numbers denote steps similar to those shown in FIG. 7 in the first embodiment and the description thereof is omitted or simplified.

In the routine shown in FIG. 12, after a current engine operating condition is detected (step 100), the ignition timing IgT is set to the first ignition timing IgT1, and the injection pressure Pcr is set to a predetermined base pressure PcrB (step 200). Subsequently, the concentration of NOx from the cylinders under the condition set in step 200 is detected and is stored as NOx1 (step 104), and then the injection pressure Pcr is increased from the current injection pressure Pcr (base pressure PcrB for the first time) by a predetermined amount α (step 202).

In the routine, after the first NOx peak injection pressure Pcr1 is recorded in step 110, the ignition timing IgT is set to the second ignition timing IgT2 that is retarded with respect to the first ignition timing IgT1, and the injection pressure Pcr is set to the predetermined base pressure PcrB (step 204). After that, the concentration of NOx from the cylinders under the condition set in step 204 is detected and stored as NOx2 (step 114), and then the injection pressure Pcr is increased from the current injection pressure Pcr (base pressure PcrB for the first time) by a predetermined amount α (step 206).

In addition, in the routine, after the second NOx peak injection pressure Pcr2 is recorded in step 120, the distillation property (T90) and octane number of the currently used fuel are calculated on the basis of the thus recorded first NOx peak injection pressure Pcr1 and second NOx peak injection pressure Pcr2 (step 208). The ECU 90 stores a map that defines T90 and the octane number in the relationship between the NOx peak injection pressures Pcr1 and Pcr2 as criterion information for determining a fuel property. Here, illustration of those maps is omitted; however, the tendency of the maps is that of the relationship shown in FIG. 11.

With the thus described routine shown in FIG. 12, the first NOx peak injection pressure Pcr1 and the second NOx peak injection pressure Pcr2 each are calculated at predetermined two levels of ignition timing, and then the octane number and distillation property of the currently used fuel are determined (detected) by referring to the criterion information. By so doing, even when the fuel property determination method according to the aspect of the invention is applied to the spark ignition internal combustion engine 60, by just executing a series of processes of the routine once, it is possible to highly accurately determine the octane number and the distillation property at the same time.

Incidentally, in the above described second embodiment, the fuel injection pressure Pcr is used as a first operating parameter that varies the degree of mixing of fuel and air that are supplied into each combustion chamber 64 of the spark ignition internal combustion engine 60. However, the first operating parameter according to the aspect of the invention, applied to the spark ignition internal combustion engine, is also not limited to the fuel injection pressure; it may be, for example, an engine coolant temperature.

In addition, in the above described second embodiment, the ignition timing IgT is used as a second operating parameter that varies the combustion temperature of an air-fuel mixture. However, the second operating parameter according to the aspect of the invention, applied to the spark ignition internal combustion engine, is also not limited to the ignition timing; it may be, for example, an intake air flow rate or a compression ratio. Note that the intake air flow rate may be, for example, varied by changing the closing timing of the intake valves using the variable intake valve mechanism 42 and, in addition, the intake air flow rate may be varied by changing the opening degree of the throttle valve 70. In addition, the compression ratio may be varied by a variable compression ratio mechanism that is able to vary the compression ratio.

In addition, in the above described second embodiment, the distillation property (T90) is used as the evaporation index. However, the evaporation index according to the aspect of the invention, applied to the spark ignition internal combustion engine, is also not limited to the distillation property; the distillation index may be, for example, the kinematic viscosity of fuel. In addition, in the aspect of the invention applied to the spark ignition internal combustion engine, it is also applicable that three or more recorded values (for example, NOx peak injection pressures) are acquired in three or more levels of first operating parameter and then the octane number and the distillation property are determined at the same time.

Note that, in the above described second embodiment, the ECU 90 executes the process of step 202 or 206 to implement an example of a "first parameter changing unit" that changes the first operating parameter. The ECU 90 executes the process of step 200 or 204 to implement an example of a "second parameter changing unit" that changes the second operating parameter. The ECU 90 executes the process of step 108 or 118 to implement an example of a "determination unit" that determines the timing at which the combustion temperature indicates the maximum value. The ECU 90 executes the process of step 110 to implement an example of a "first recording unit" that records the first operating parameter as a first recorded value. The ECU 90 executes the process of step 120 to implement an example of a "second recording unit" that records the first operating parameter at the timing, at which the combustion temperature is determined to indicate the maximum value, as a second recorded value. The ECU 90 executes the process of step 208 to implement an example of a "fuel property determination unit" that determines the octane number and evaporation index of fuel. In addition, the ECU 90 executes the process of step 104 or 114 to implement an example of an "NOx concentration detecting unit" that detects the NOx concentration.

The invention claimed is:

1. A fuel property determination system for a compression ignition internal combustion engine, comprising:
    a first parameter changing unit that is configured to change a fuel injection pressure for varying a degree of mixing of fuel and air that are supplied into a combustion chamber of the internal combustion engine;
    a second parameter changing unit that is configured to change a fuel injection timing for varying a combustion temperature of a mixture of fuel and air;
    a determination unit that includes an NOx concentration detecting unit that is configured to detect an NOx concentration in exhaust gas flowing through an exhaust passage, the determination unit being configured to determine that a timing at which the NOx concentration in the exhaust gas indicates a maximum value is a timing at which the combustion temperature indicates the maximum value when the fuel injection pressure is changed under the condition that the fuel injection timing is fixed;
    a first recording unit that is configured to record the fuel injection pressure at the timing at which the determination unit determines that the combustion temperature indicates the maximum value under the condition that the fuel injection timing is fixed to a predetermined first setting value as a first recorded value;
    a second recording unit that is configured to record the fuel injection pressure at the timing at which the determination unit determines that the combustion temperature indicates the maximum value under the condition that the fuel injection timing is fixed to a predetermined second setting value as a second recorded value; and
    a fuel property determination unit that is configured to determine a cetane number and evaporation index of the fuel on the basis of the first recorded value and the second recorded value.

2. The fuel property determination system according to claim 1, wherein the evaporation index is a distillation property.

3. The fuel property determination system according to claim 1, wherein the evaporation index is the kinematic viscosity of the fuel.

4. A fuel property determination system for a spark ignition internal combustion engine, comprising:
    a first parameter changing unit that is configured to change a fuel injection pressure for varying a degree of mixing of fuel and air that are supplied into a combustion chamber of the internal combustion engine;
    a second parameter changing unit that is configured to change an ignition timing for varying a combustion temperature of a mixture of fuel and air;
    a determination unit that includes an NOx concentration detecting unit that is configured to detect an NOx concentration in exhaust gas flowing through an exhaust passage, the determination unit being configured to determine that a timing at which the NOx concentration in the exhaust gas indicates a maximum value is a timing at which the combustion temperature indicates the maximum value when the fuel injection pressure is changed under the condition that the ignition timing is fixed;
    a first recording unit that is configured to record the fuel injection pressure at the timing at which the determination unit determines that the combustion temperature indicates the maximum value under the condition that the ignition timing is fixed to a predetermined first setting value as a first recorded value;
    a second recording unit that is configured to record the fuel injection pressure at the timing at which the determination unit determines that the combustion temperature indicates the maximum value under the condition that the ignition timing is fixed to a predetermined second setting value as the second recorded value; and
    a fuel property determination unit that is configured to determine an octane number and evaporation index of the fuel on the basis of the first recorded value and the second recorded value.

5. The fuel property determination system according to claim 4, wherein the evaporation index is a distillation property.

6. The fuel property determination system according to claim 4, wherein the evaporation index is the kinematic viscosity of the fuel.

* * * * *